Figure 1:
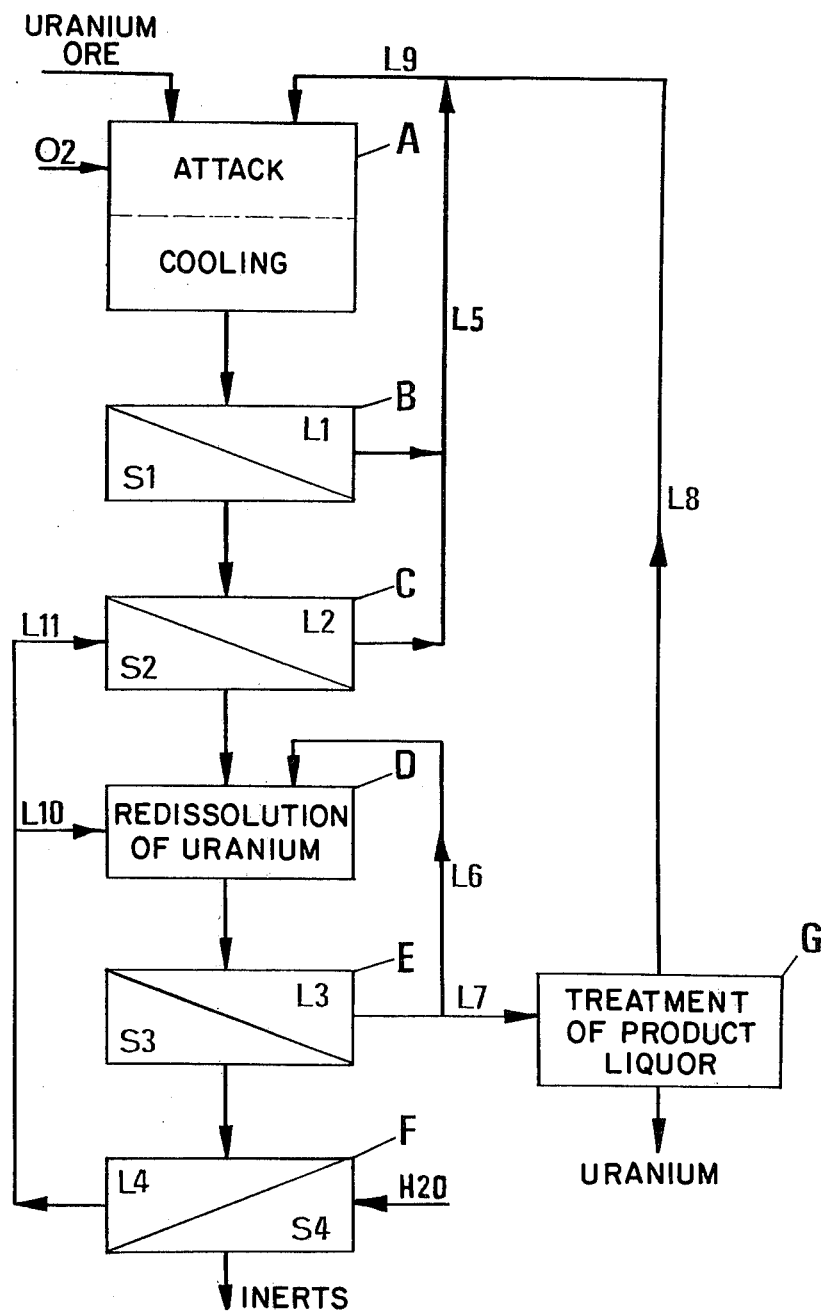

United States Patent [19]

Maurel et al.

[11] 4,400,359

[45] Aug. 23, 1983

[54] PROCESS FOR THE HOT OXIDIZED ATTACK ON A URANIFEROUS ORE BY A CONCENTRATED ALKALINE LIQUOR WITH SIMULTANEOUS URANIUM PRECIPITATION

[75] Inventors: Pierre Maurel; Francois Nicolas, both of Aix en Provence, France

[73] Assignee: Aluminium Pechiney, Lyons, France

[21] Appl. No.: 172,140

[22] Filed: Jul. 25, 1980

[30] Foreign Application Priority Data

Jul. 27, 1979 [FR] France ................... 79 19910
Feb. 5, 1980 [FR] France ................... 80 02879
Mar. 18, 1980 [FR] France ................... 80 07119

[51] Int. Cl.³ .......................................... C22B 60/02
[52] U.S. Cl. ................................... 423/15; 423/17
[58] Field of Search ............................ 423/15, 17

[56] References Cited

U.S. PATENT DOCUMENTS 4,024,216  5/1977  Finch et al. ............... 423/17
4,296,073 10/1981  Maurel et al. ............. 423/17

OTHER PUBLICATIONS

Robert C. Merritt, *The Extractive Metallurgy of Uranium*, pp. 88–97, Colorado School of Mines Research Institute (1971).

*Primary Examiner*—Benjamin R. Padgett
*Assistant Examiner*—Matthew A. Thexton
*Attorney, Agent, or Firm*—McDougall, Hersh & Scott

[57] ABSTRACT

The present invention concerns a continuous process for the oxidizing attack of a uraniferous ore by means of an aqueous recycling liquor which contains in a dissolved state alkaline carbonate and bicarbonate and uranium at a concentration close to the limit of solubility thereof at the temperature of the attack operation. The uranium which is precipitated in the course of the attack operation is collected within the solid phase which remains after attack. By redissolution in a suitable aqueous liquor and separation from the sterile materials, a uraniferous liquor is obtained.

47 Claims, 6 Drawing Figures

PROCESS FOR THE HOT OXIDIZED ATTACK ON A URANIFEROUS ORE BY A CONCENTRATED ALKALINE LIQUOR WITH SIMULTANEOUS URANIUM PRECIPITATION

The present invention concerns a continuous process for the oxidising attack on a uraniferous ore by an aqueous recycling liquor, containing in a dissolved condition alkaline carbonate and bicarbonate and uranium in a concentration close to the limit of its solubility at the attack temperature, and for recovery of the precipitated uranium within the solid phase remaining after the attack operation.

It has long been known for the alkaline attack of uraniferous ores containing alkaline-earth metal carbonates such as calcium and magnesium carbonates, in substantial quantities, to be effected preferentially by means of an aqueous liquor of sodium carbonate and bicarbonate, the concentration of those two components in the liquor being increased in proportion to increasing refractoriness of the ore.

The attack operation is generally carried out in an oxidising medium produced for example by blowing free oxygen into the hot reaction medium in order to permit oxidation of the uranium and solubilisation thereof, but also to ensure oxidation of the sulphides of impurities, and the organic matter present in the ore.

In the specialist literature, the concentration of reactants in the attack liquor is generally low, and this, in the case of attacking a refractory uraniferous ore, results in the level of efficiency in regard to solubilisation of the uranium being generally poor.

A known way of increasing the level of solubilisation efficiency is to use an attack liquor which has higher levels of concentration of the reactants. In this case, the liquor which is collected after the attack operation still has a large amount of unreacted $CO_3^{=}$ and $HCO_3^{-}$ ions, the presence of which becomes increasingly inconvenient, in the subsequent operation of extracting the uranium and in the operation of removing the solubilised impurities in the liquor from the ore attack operation, as the levels of concentration of such ions rise, as the liquor produced by the operation of attacking the uraniferous ore is then treated by a conventional method for extracting the uranium therefrom.

Generally, the liquor after the attack operation is treated by means of a solution of sodium hydroxide in order to precipitate the uranium in the form of sodium uranate, and, in order to be satisfactory, this precipitation step requires a sufficient proportion of NaOH in the free state after complete transformation of the $HCO_3^{-}$ ions present in the liquor, into $CO_3^{=}$ ions. However, it is well known to the man skilled in the art that increasing the proportion of $CO_3^{=}$ ions in the liquor causes a substantial increase in the degree of solubility of uranium in the medium, and this reduces the amount of sodium uranate which can be collected by precipitation.

Then, the mother liquor which has a reduced uranium content but which contains impurities which are solubilised in the attack operation is subjected to a purification and regeneration treatment before being recycled to the operation of attacking the 'ore'. A treatment of this nature is described by the present applicants in French patent application No. 77 30176 of Sept. 30, 1977 and additions Nos. 78 24843 and 78 24844 dated Aug. 18, 1978. This treatment comprises treating the liquor from the attack operation, which has a reduced uranium content, at a temperature which is at most equal to boiling temperature, by the amount of lime required for converting the carbonates present into sodium hydroxide, then effecting separation of a precipitate which essentially comprises calcium carbonate and organic and inorganic calcium salts and the sodium hydroxide-enriched liquor, concentrating that liquor until precipitation of sodium sulphate occurs, and recovering a sodium hydroxide-rich liquor of which a part is recycled to the operation of precipitating the sodium uranate and the other part is carbonated by bringing it into contact with carbon dioxide gas and recycled to the ore attack operation. If the attack liquor is concentrated in respect of reactants, the liquor after the attack operation, which has a reduced uranium content, requires the use, for purification and regeneration thereof before recycling, of substantial amounts of lime for total causticization and a high rate of consumption of $CO_2$ for regeneration of the recycled liquor. If the liquor resulting from the attack operation is to be processed on an ion-exchange resin for recovering the uranium, the presence of substantial amounts of $CO_3^{=}$ and $HCO_3^{-}$ ions in the liquor is a serious disadvantage or can even make it impossible to fix the uranium on the resin.

Hence, the processes described in the specialist literature reveal a contradiction as between the conditions for solubilisation of the uranium by the attack liquor and the conditions for restoring the uranium by that liquor after the attack operation.

Finally, the presence in the liquors of organic matter which is solubilised in the attack operation causes the formation of uraniferous complexes of which some are not soluble in the operation of washing the solid sterile fraction and which are accordingly entrained with that fraction, thus reducing the efficiency in respect of recovery of the uranium.

Faced with such disadvantages, the applicants, continuing their research in this area, discovered and developed a process for the attack on uraniferous ores giving a post-attack liquor which has a high proportion of uranium and a low proportion of alkaline carbonate and bicarbonate, without substantial uranium losses.

The continuous, hot oxidising attack process according to the invention comprising attacking the uraniferous ore in a divided form in the presence of an oxidising agent in the reaction medium by means of an aqueous liquor of alkaline carbonate and bicarbonate under concentration, temperature and pressure conditions which cause solubilisation of the uranium present in the ore, collecting a suspension of a solid phase in a liquid phase, separating the solid phase from the liquid phase, is characterised in that:

(a) the attack liquor is formed by the liquid phase containing in solution alkaline carbonate and bicarbonate and uranium in a concentration close to the limit of solubility thereof at the attack temperature, separated from the suspension resulting from the attack operation, re-adjusted in respect of attack reactants, and recycled to the operation of attacking the ore, (b) the uranium in the ore is solubilised during the attack operation which is carried out at a temperature lower than 300° C. by the attack liquor in which the uranium is maintained in a state of saturation and is then immediately re-precipitated in the attack medium, (c) the suspension collected after the attack operation is cooled to a temperature which is still higher than 40° C., (d) the solid phase which is separated from the suspension resulting from the attack operation and which is formed by the sterile matter and precipitated uranium is treated by means of an aqueous liquor in order on the one hand to recover the impregnation liquor resulting from the attack operation and on the other hand to re-dissolve the precipitated uranium, and (e) the suspension resulting from re-dissolution of the uranium is subjected to a step for separation thereof into a solid fraction which, after washing, is formed by the sterile matter and a useful uraniferous liquor.

Whereas the prior processes comprise making the uranium and a part of the impurities contained in the ore, soluble in the attack liquor, and then, after removal of the sterile matter, treating the uraniferous liquor for extracting the uranium therefrom, the process of the invention is found to be the reverse to the prior art, since it comprises solubilising and then precipitating the uranium in the attack medium, removing it from the attack medium with the sterile matter in the form of a solid phase, and then separating the uranium from the sterile matter by re-dissolving it in a suitable aqueous liquor.

As is well known, the oxidising attack of uraniferous ores is effected in the presence of an oxidising agent. Generally, the oxidising agent is oxygen which is blown into the reaction medium, in the form of oxygen-enriched air or just oxygen alone. The oxygen partial pressure in the reaction vessel is from 0.1 to 40 bars but preferably from 5 to 15 bars.

However, the oxidising medium for the attack on uraniferous ore may also be produced by the introduction of an oxidising agent which is liquid or solid under normal conditions such as potassium permanganate, sodium dioxide or sodium persulphate.

The aqueous attack liquor which is a recycled liquor comprises the liquid phase resulting from the attack on the uraniferous ore. Experience has shown that when the operation of attacking the uraniferous ore is performed by means of an aqueous liquor containing alkaline carbonate and bicarbonate and uranium at a concentration close to the limit of solubility thereof at the attack temperature, the uranium in the ore is solubilised and then immediately precipitated in the attack medium on the sludge formed by the sterile matter.

The alkaline carbonate and bicarbonate which are used as reactants for attacking uraniferous ores are in practice sodium, potassium and ammonium carbonate and bicarbonate.

Depending on the nature of the ore, the concentration of the liquor for the attack operation may vary within wide limits in regard to each of the reactants present. Thus, the concentration in respect of $HCO_3^-$ may vary between 0 and 220 g/l but preferably between 15 g/l and 80 g/l, while the concentration in respect of $CO_3^=$ may vary between 10 g/l and 90 g/l but preferably between 20 g/l and 60 g/l, and the concentration in respect of uraniferous ions may vary between 0.5 g/l and 10 g/l and more generally between 1 and 5 g/l.

The range of temperatures used for the attack operation has been the subject of particular study by the present applicants who noted with lively interest that, when the concentration of attack reactants is maintained at a constant level, the solubility of the uranium decreased in the attack medium when the attack temperature increased. Thus, the applicants were able to verify that the operation of attacking the uraniferous ore must be performed at the highest possible temperature in order to promote the attack mechanism, and reduce the concentration of uranium in the attack liquor, that is to say, to promote precipitation of uranium in the attack medium.

In practice, the ore attack temperture does not exceed 300° C. and is preferably between 120° C. and 240° C.

The duration of the attack operation depends on the nature of the ore and the attack temperature and is generally between a few minutes and six hours and may reach 15 hours in the case of refractory ores, even if the attack operation is performed at elevated temperature.

However, in the case of some ores, it may be found advantageous for a normal oxidation catalyst to be introduced into the reaction medium, to improve the attack mechanism.

The suspension resulting from the attack operation is subjected to cooling to reduce its temperature to a value of from 40° C. to 100° C. The cooling step may be carried out by known means such as expansion and/or counter-flow exchange as between the suspension which is issuing from the attack step and the suspension which is passing into the attack operation. It must be effected rapidly so that the precipitated uranium does not undergo substantial re-dissolution in the attack liquor. When cooling is effected by expansion, a certain amount of water is vaporised, depending on the temperature of the attack operation. When cooling is effected entirely by direct heat exchange between the two suspensions, as already referred to above, there is no vaporisation effect. The solid phase which is separated from the suspension from the operation of attacking the ore, which is formed by sterile matter and precipitated uranium, is impregnated with the attack liquor. In order to remove the impregnation liquor, the solid phase is treated by means of an aqueous liquor to recover the impregnation liquor from the attack operation, and re-dissolve the precipitated uranium.

In accordance with a particular arrangement, recovery of the impregnation liquor and re-dissolution of the precipitated uranium are effected simultaneously by means of the same aqueous liquor.

In accordance with another particular feature, the recovery of a major part of the impregnation liquor from the solid phase from the attack operation, and re-dissolution of the precipitated uranium as well as the minor part of the impregnation liquor are effected successively by means of the same aqueous liquor or aqueous liquors of different compositions.

The aqueous liquors used for recovery of the impregnation liquor and re-dissolution of the precipitated uranium mainly contain from 0 to 15 g/l of $CO_3^=$, 0 to 50 g/l of $CO_3H^-$ and 0 to 10 g/l of uranium.

Re-dissolution of the uranium is generally effected at a temperature of from 40° C. to 80° C.

The impregnation liquor which is extracted in this way is then recycled to the attack step, while the suspension resulting from re-dissolution of the uranium undergoes separation into a solid fraction which, after washing, is formed by the sterile matter and a useful uraniferous liquor.

This useful uraniferous liquor can be recycled, in a minor proportion thereof, to the operation of re-dissolving the uranium or to the attack step, while the other major proportion of the liquor is treated by a known process for extracting the uranium.

The water for washing the sterile matter, after re-dissolution of the uranium, may form an aqueous recycling liquor containing uranium, carbonate and bicarbonate ions and impurities, in a dissolved condition.

It can be divided into two fractions, the first being used for washing the solid phase and the second being used for re-dissolution of the precipitated uranium in the solid phase.

In a first alternative form, the applicants also found that, after the operation of attacking the ore, cooling of the suspension resulting from the attack operation, separation of the solid and liquid phases of the suspension, and treatment of the solid phase which comprises re-dissolution by an aqueous liquor of the uranium precipitated in the attack operation, recovery of the impregnation liquor and finally separation of the solid and liquid phases of the suspension resulting from re-dissolution of the uranium, it is desirable for the operation of washing the solid phase resulting from the last separation step to be performed in two stages, the first stage comprising treating said solid phase with an aqueous recycling solution which has a low uranium content, and then a second stage which comprises concluding the washing operation with water.

It has been found in fact that carrying out the washing operation in two stages makes it possible consequentially to reduce the amount of water which is introduced into the ore treatment cycle, without causing an increase in the uranium losses in the sterile matter, after washing thereof.

In accordance with this first alternative form of the process, the first stage of washing the solid fraction is generally performed by means of an aqueous recycling solution resulting from the treatment of the uraniferous production liquor produced by the separation operation subsequent to re-dissolution of the uranium after the uraniferous production liquor has undergone a process for restoring the uraniferous ions by a means known to the man skilled in the art such as precipitation, extraction by solvent, extraction by ion exchange, etc.

Before carrying out the process for restoration of the uranium, it may be advantageous for the uraniferous production liquor to be subjected to a treatment of thermal decomposition of the bicarbonate ions in a dissolved condition so that, when the uranium is extracted by basic precipitation, the consumption of the reactant used for the precipitation step is lower.

After this precipitation operation, the liquor with its reduced uranium content constitutes the aqueous recycling solution which is used in the first stage of washing the solid fraction. It may be used as it is, or it may first undergo various treatments such as for example causticization, purification in respect of molybdenum and vanadium, purification in respect of sulphate ions, and carbonation.

The aqueous recycling solution for the first stage of washing the solid fraction contains sodium carbonate, possibly sodium bicarbonate, sodium sulphate and a generally small proportion of uranium.

The quantitative composition of the recycling liquor for the first washing stage is from 5 g/l to 170 g/l $CO_3^=$ and preferably from 10 g/l to 60 g/l of $CO_3^=$, from 90 g/l to 0 g/l and preferably from 75 g/l to 10 g/l of $HCO_3^-$, while the uranium content must be at a minimum, generally less than 1 g/l but preferably less than 0.05 g/l.

The liquor issuing from the first washing stage, which contains the major part of the solid fraction impregnation liquor, is recycled to the ore attack operation.

The second stage of washing the solid fraction issuing from the first washing stage is performed by displacement of the impregnation liquor by means of water.

The liquor from the second washing stage is then recycled to the circuit, preferably to the step of re-dissolving the uranium. The quantitative composition of the liquor from the second washing stage may vary between 5 g/l and 45 g/l of $CO_3^=$, from 0 g/l to 80 g/l of $HCO_3^-$, but preferably from 10 g/l to 30 g/l of $CO_3^=$, and from 10 g/l to 40 g/l of $HCO_3^-$.

In accordance with another alternative form of the process, the applicants have found that, after the operation of attacking the ore and cooling of the solution resulting from the attack operation have been carried out, it is possible and desirable for the uranium precipitated at the moment of the attack operation to be re-dissolved in the liquid phase of the cooled suspension, and then for the solid and liquid phases of the suspension produced after re-dissolution of the uranium to be separated and for the solid phase which is thus separated to be washed, while the liquid phase containing the re-dissolved uranium is divided into two fractions, a minor fraction being recycled to the attack operation and the other major fraction forming the uraniferous liquor which can be put to use.

The applicants have in fact found that re-dissolution of the uranium precipitated during the attack operation is complete in the liquid phase of the suspension resulting from the attack operation, after it has been cooled to a temperature of more than 40° C., and that it becomes possible to make the process according to the invention more economic, by suppressing the stages preceding the operation of re-dissolution of the uranium which is precipitated in the attack operation, which consisted of separating the liquid and solid phases of the suspension resulting from the ore attack operation, and the operation of washing the separated solid phase.

In this case, the amount of uranium precipitated in the attack operation, which may be rendered soluble in the liquid phase of the cooled suspension resulting from the attack operation, depends on the limit of solubility of the uranium in the liquid phase.

It is well known to the man skilled in the art that the above-mentioned uranium solubility limited is linked to the temperature of the medium, the concentrations of the different salts dissolved in the liquid phase such as alkaline carbonate, bicarbonate and sulphate, and the organic substances present.

Hence, so that the uranium precipitated in the attack operation is completely solubilised, the uranium content which is obtained after re-dissolution thereof in the above-mentioned liquid phase must be lower than the limit of solubility of that phase. When the uranium content after re-dissolution thereof in the liquid phase is lower than the limit of solubility of said phase, re-dissolution of the uranium is effected in the single liquid phase resulting from the operation of attacking the ore. However, when it is found that the uranium is not completely solubilised in the re-dissolution operation, that is to say, when the amount of uranium precipitated exceeds the capacity for solubilisation of the liquid phase resulting from the attack operation, it is necessary for a recycled liquid fraction, referred to as the re-dissolution liquor, which originates generally from the subsequent operation of washing the sterile substances produced after re-dissolution of the uranium, to be introduced into the stage of re-dissolving the uranium.

The recycled liquid fraction which is also referred to as the re-dissolution liquor and which is intended to be introduced into the uranium re-dissolution medium contains alkaline carbonate and bicarbonate. The quantitative composition of the re-dissolution liquor, like that of the liquor from the second washing stage, may vary between 5 g/l and 45 g/l of $CO_3^=$ and from 0 g/l to 80 g/l of $HCO^-$, but preferably from 10 g/l to 30 g/l of $CO_3^=$ and 10 g/l and 40 g/l of $HCO_3^-$.

After re-dissolution of the uranium has been performed in the medium resulting from the attack operation, the solid phase separated from the suspension resulting from re-dissolution of the uranium and comprising the sterile substances is impregnated with the liquor resulting from the re-dissolution step. In order to remove the impregnation liquor, said solid phase is treated by means of an aqueous recycling solution from the operation of treating the uraniferous production liquor produced in the step of re-dissolution of the uranium after the uraniferous production liquor has been subjected to a process for restoration of the uraniferous ions by a means known to the man skilled in the art such as precipitation, extraction by solvent, extraction by ion exchange, etc.

The aqueous recycling solution contains alkaline carbonate and bicarbonate and a generally low uranium content. The quantitative composition of this solution is from 5 g/l to 170 g/l but preferably from 10 g/l to 60 g/l of $CO_3^=$, from 90 g/l to 0 g/l but preferably from 75 g/l to 10 g/l of $HCO_3^-$, while the uranium content is generally less than 1 g/l but preferably less than 0.5 g/l.

Thus, this aqueous recycling solution is of the same composition as the recycling liquor intended for the first washing stage in accordance with the first alternative form of the process as referred to above.

After the solid phase has been treated by means of the above-mentioned aqueous recycling solution, the solid phase is subjected to washing with water.

The sterile matter impregnation liquor which is thus extracted is then recycled to the attack operation, in part or in its entirety, or is used as a uranium production liquor.

Finally, the process according to the invention may also include one or more previous treatments of the ore before the ore is subjected to the actual attack operation, in accordance with the above-indicated conditions.

Firstly, it may be found necessary for the ore to be subjected not to a normal crushing operation but to a crushing operation which is taken to a particularly advanced stage, in order to multiply the interfaces between the grains of the ore and the attack liquor.

Likewise, in regard to some ores, it may be advantageous to remove the organic substances contained in the liquor after the ore attack operation, either after separation of the solid phase containing the sterile substances and the precipitated uranium, or on the suspension resulting from the attack operation, that is to say, before separation of the liquid and solid phases. In this case, the elimination operation is effected by means of an oxidising agent such as for example ozone, sodium persulphate or potassium permanganate, or by anodic oxidation.

However, it is not impossible for the organic materials to be removed in a preliminary operation by controlled-temperature calcination of the ore before it is subjected to the attack operation.

It may also be found to be advantageous to carry out a treatment, prior to the attack operation, for physical enrichment of the ore by the methods known to the man skilled in the art such as flotation.

Finally, the uraniferous production liquor undergoes a process for making use of the uraniferous ions, by means of a process known to the man skilled in the art such as precipitation, solvent extraction, ion exchange extraction, etc, while the liquor with its reduced uranium content may undergo various treatments such as causticization, purification in respect of molybdenum and vanadium, purification in respect of sulphate ions, carbonation, etc, before being recycled to the ore attack operation.

The invention will be better appreciated by reference to the description of FIGS. 1 to 6 which show embodiments.

Figure 2:
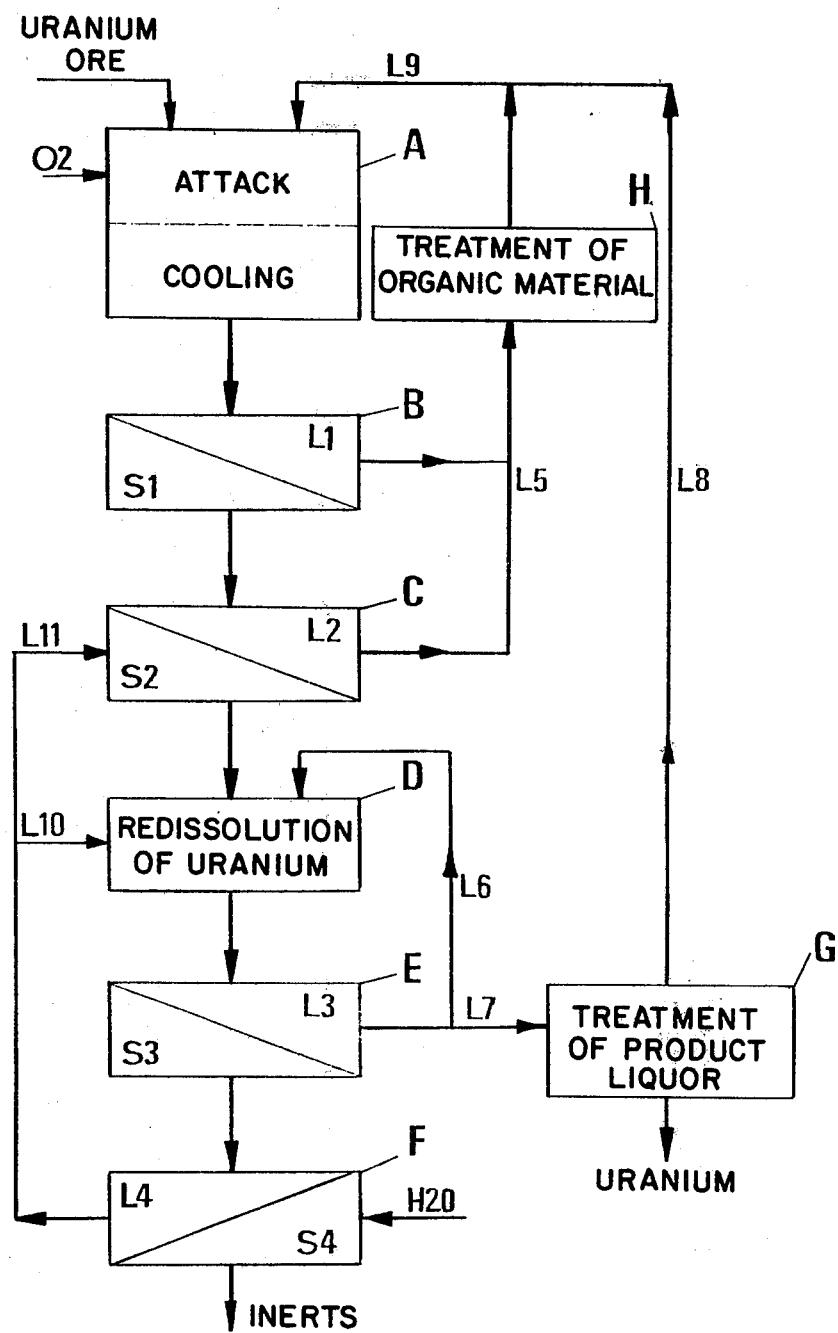
Figure 3:
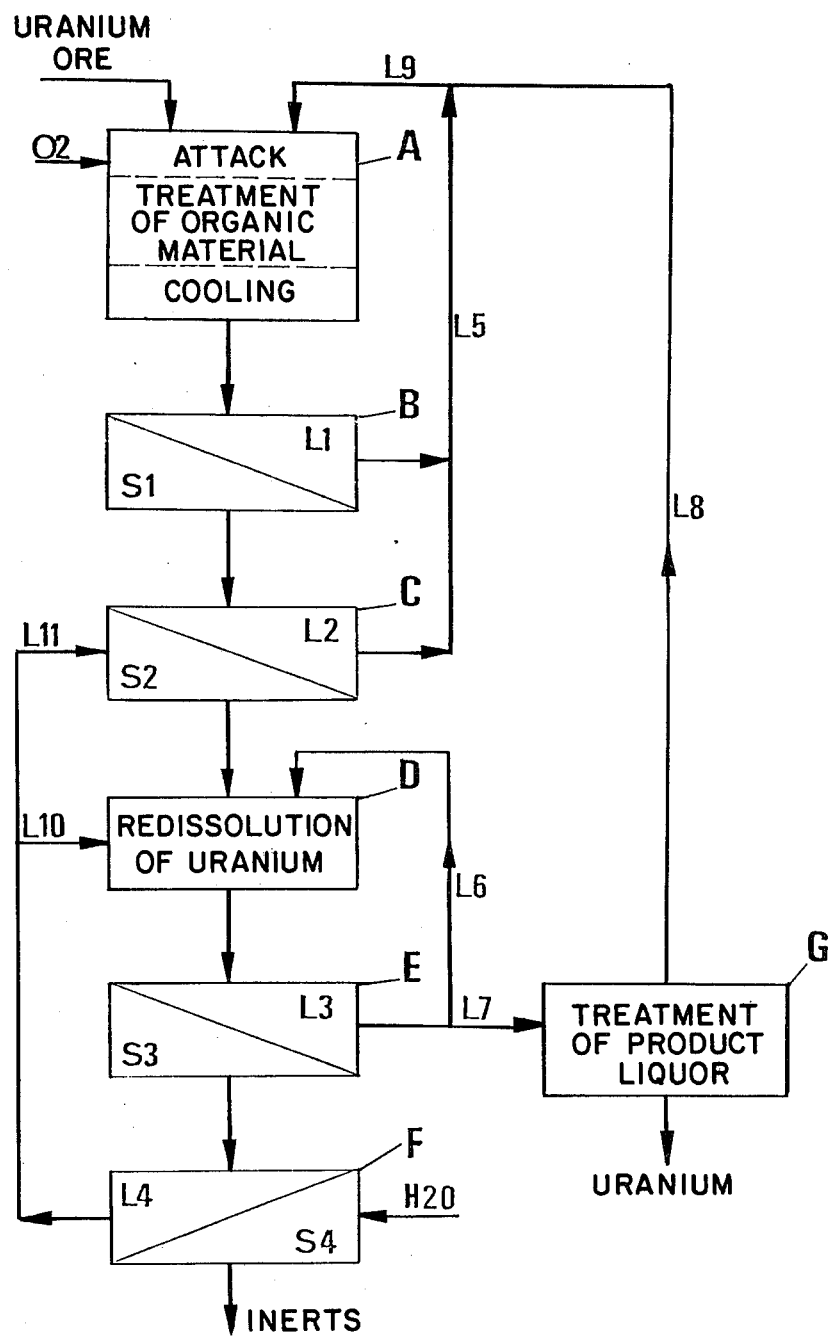
Figure 4:
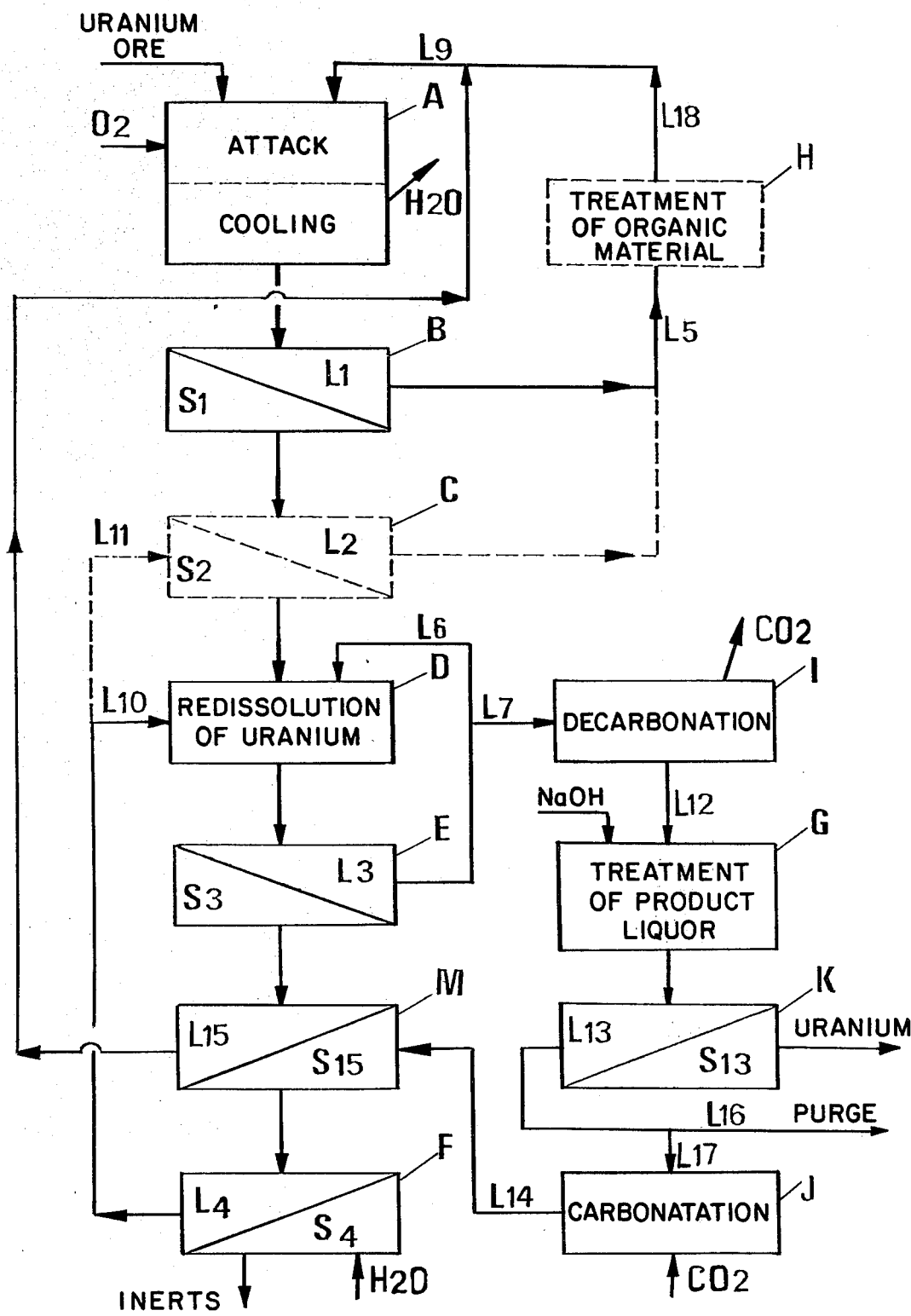
Figure 5:
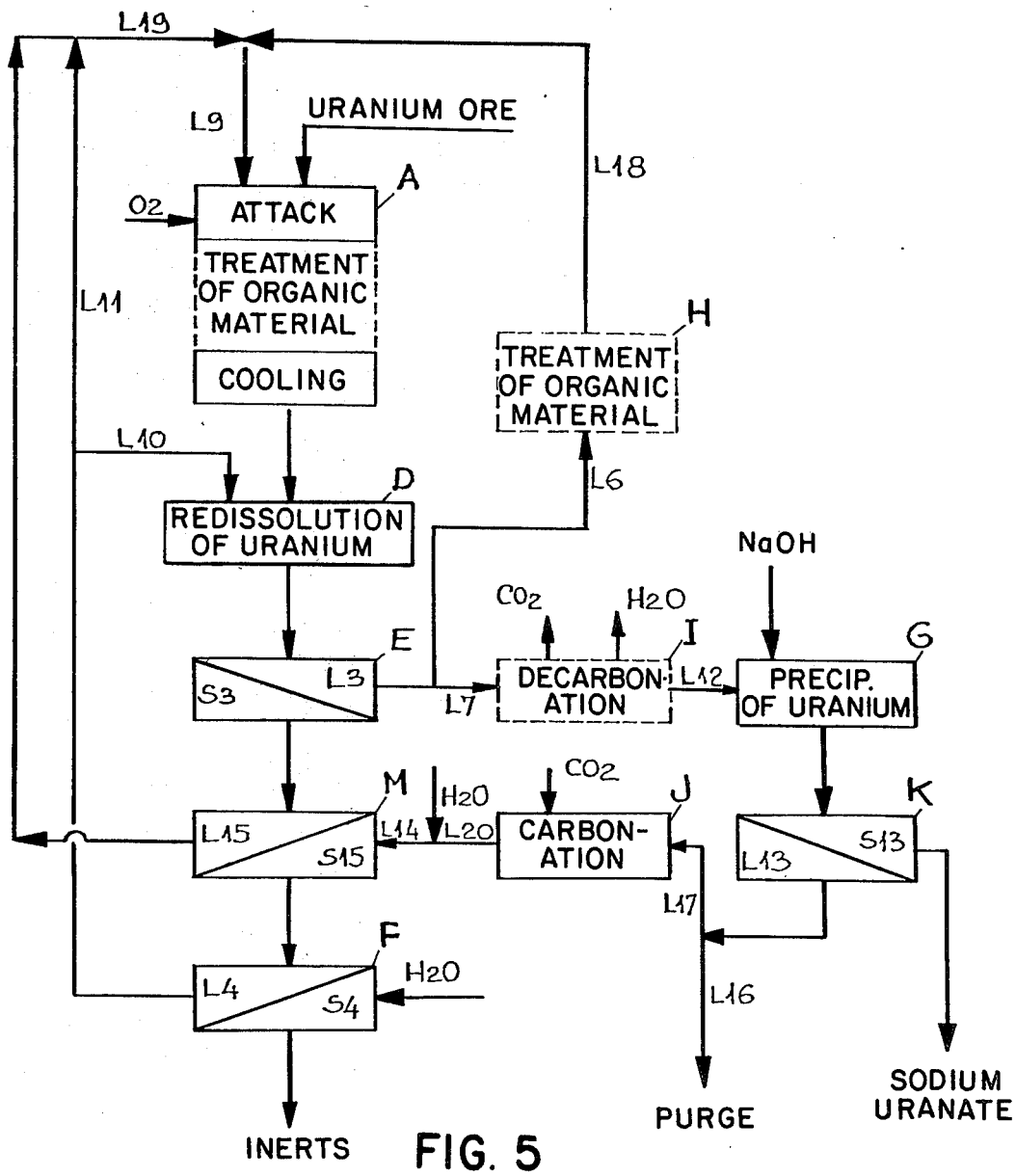
Figure 6:
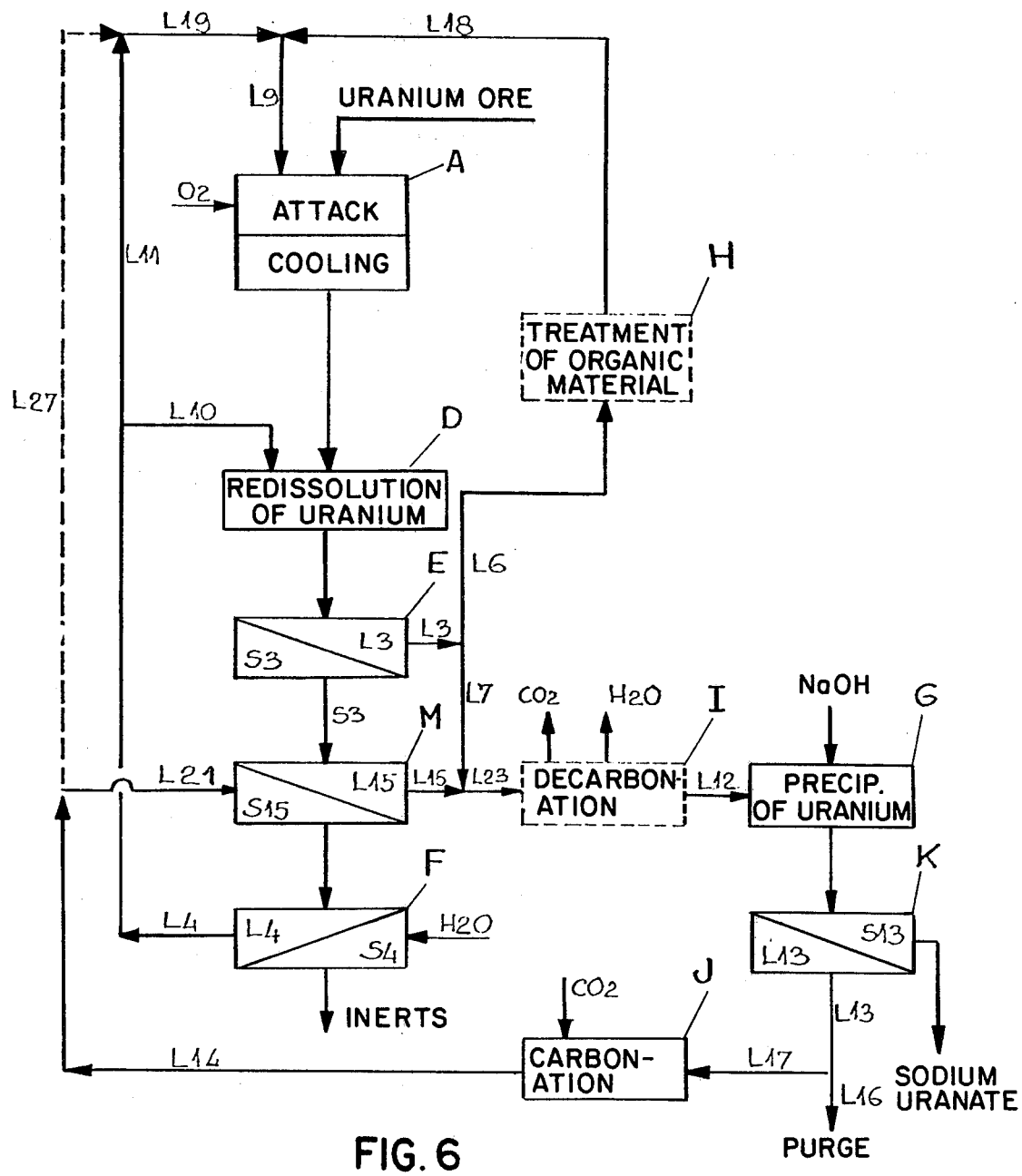

FIG. 1 is a diagrammatic view of the process according to the invention for attacking a uraniferous ore which is virtually devoid of organic materials, FIG. 2 is a diagrammatic view of the process according to the invention for attacking uraniferous ores which are not devoid of troublesome organic materials, the latter being subjected to an oxidation treatment which is carried out on the liquid phase that is recycled to the attack operation, FIG. 3 is also intended for attacking a uraniferous ore which is not devoid of organic materials, the oxidation treatment being carried out on the suspension resulting from the attack on the uraniferous ore, FIG. 4 is a view of the first alternative form of the process according to the invention, that is to say, two-stage washing of the solid phase resulting from the solid-liquid separation step after re-dissolution of the uranium, FIG. 5 is a view of the second alternative form of the process of the invention, concerning re-dissolution of the uranium precipitate in the liquid phase resulting from the ore attack operation, and FIG. 6 shows another arrangement of the process in accordance with the second alternative form of the invention.

Referring to FIG. 1, the uraniferous ore in divided form and without organic materials and the recycled attack liquor L9 are introduced into the reaction vessel A at the same time as oxygen is blown into the reaction medium.

The suspension resulting from the attack operation is partly cooled by expansion, with the removal of a certain amount of water, and is then introduced into B for separation of a cake S1 formed by the mixture of the sterile fraction and the uranium precipitate and an aqueous liquor L1 which contains uranium and alkaline carbonate and bicarbonate in a dissolved condition.

The mother liquors of the cake S1 are displaced in C by means of a recycled washing liquor L11.

The mother liquors L2 which are displaced in this way are mixed with the liquor L1 forming the liquor L5 which is recycled to the ore attack operation at A.

The resulting cake S2 extracted from C is introduced into D for re-dissolution of the uranium precipitate in a suitable liquor formed by the mixture of two recycled liquors L10 and L6.

The liquor L10 is of the same composition as the above-mentioned liquor L11.

When re-dissolution of the uraniferous ions is concluded, the resulting slurry is treated in E for separation of a cake S3 and a liquor L3.

The cake S3 which essentially comprises the sterile matter is displaced to F where it is subjected to washing with water, with recycling of the washing liquor L4 to C and D, as fractions L11 and L10.

The liquor L3 which is rich in dissolved uranium, in the form of an alkaline uranyl carbonate is divided into two unequal fractions, one fraction L6 being recycled to D for re-dissolution of the uranium, while the other fraction L7 which is the larger fraction forms the production liquor from which the uranium is extracted in G by a process which is not described, while the resulting liquor L8 with a reduced uranium content and freed from the impurities originating from the uraniferous ore by a known process (not described here) is recycled to A, after carbonation, to form, in mixture with the liquor L5, the attack liquor L9.

Referring now to FIG. 2, the uraniferous ore which is in a divided form and which contains troublesome organic materials is introduced into A with the attack liquor L9 at the same time as oxygen is blown into the reaction medium. After cooling, the slurry produced after the attack step is introduced into B for separation of a cake S1 formed by the mixture of the sterile fraction and the uranium precipitate, and aqueous liquor L1 which in solution contains alkaline carbonate and bicarbonate, uranium and organic materials which are solubilised in the attack operation.

The mother liquors of the cake S1 are displaced in C by means of a recycled washing liquid L11.

The mixture of liquors L1 and L2 is then displaced to H for treatment of the organic materials by means of an oxidising agent, giving a purified liquor L9.

The other stages of the process according to the invention are indentical to those described with reference to FIG. 1.

FIG. 3 is concerned with a particular arrangement of the process of FIG. 2. The uraniferous ore containing organic matter is put into a divided form and then introduced into A with the attack liquor L9, while oxygen is blown into the reaction medium. The slurry produced after the attack operation is treated in A by means of an oxidising agent to destroy the troublesome organic materials. At the outlet from A and after cooling, the slurry is passed to B for separation of the solid and liquid phases which are then subjected to the stages of the process according to the invention, as described for example with reference to FIG. 1.

Referring now to FIG. 4, the uraniferous ore in a divided form and the recycled attack liquor L9 are introduced into the reaction vessel A at the same time as oxygen is blown into the reaction medium. The suspension resulting from the attack operation is partly cooled by expansion, with the removal of a certain amount of water, and is then introduced into B for separation of a cake S1 formed by the mixture of the sterile fraction and the uranium precipitate and an aqueous liquor L1 which in solution contains alkaline carbonate and bicarbonate and uranium.

The mother liquors of the cake S1 are displaced in C by means of a recycled washing liquor L11. The mother liquors L2 which are displaced in this way are mixed with the liquor L1 forming the liquor L5 which is recycled to the step A for attack on the ore.

The resulting cake S2 which is extracted from C is introduced into D for re-dissolution of the uranium precipitate in a suitable liquor formed by the recycling liquors L10 and L6.

The liquor L10 is of the same composition as the above-mentioned liquor L11 which is used for washing the cake S2.

In accordance with a particular arrangement, the cake S1 formed by the mixture of the sterile fraction and the uranium precipitate may be introduced directly into D without the mother liquors first being displaced in C, for re-dissolution of the uranium precipitate in the liquors L6 and L10, the latter being formed by the whole of the liquor L4 from the washing step F.

When re-dissolution of the uranium precipitated in the attack operation has been concluded, the resulting slurry is treated in E for separation of a cake S3 and a liquor L3.

The cake S3 which essentially comprises the sterile materials is, in accordance with the invention, put into M where it is subjected to the first washing stage by providing for partial displacement of the impregnation liquor by means of a recycling liquor L14 which originates for example from the cycle of treating the production liquor L7 containing the uranium which is to be put to use.

The displaced mother liquors form the liquor L15 which is recycled to the ore attack operation.

The resulting cake S15 which is extracted in M is introduced into F where it undergoes the second washing stage using water with recycling of the washing liquor L4 to C and D, in the form of fractions L10 and L11, when the washing operation is carried out in C or, in accordance with the above-mentioned alternative form, with recycling of said washing liquor L4 to D in the form of the single fraction L10 when the cake S1 is introduced directly into the zone D for re-dissolution of the uranium, without first washing the cake in C.

The liquor L3 which is rich in dissolved uranium in the form of an alkaline uranyl carbonate is divided into two unequal fractions, one fraction L6 being recycled to D for re-dissolution of the uranium and the other fraction L7 which is the larger fraction constituting the production liquor from which the uranium is extracted in G by a known process such as for example in the form of a sodium uranate.

When the uranium is extracted in the form of sodium uranate, the uranium-rich liquor L3 of which a part is transferred in the form of L6 to D for re-dissolution of the uranium is introduced in the form of L7 into I forming a zone for decomposition of sodium bicarbonate, in accordance with the following reaction:

$$2HCO_3Na \rightarrow Na_2CO_3 + CO_2 + H_2O$$

which results in $CO_2$ being given off.

The debicarbonated liquor L12 is introduced into G at the same time as sodium hydroxide (NaOH) to cause precipitation of the sodium uranate.

The slurry produced in G is introduced into K for separation of the solid and liquid phases S13 and L13 respectively.

The solid phase S13 which is formed by sodium uranate is then subjected to various treatments of known type which however are not described herein, for recovery of a pure uranium compound.

The liquid phase L13 issuing from K is then divided into two unequal fractions. The smaller fraction L16 forms a purge liquor for removing the impurities which are solubilised in the attack operation and for maintaining at substantially constant values the volume of the liquors and the amount of sodium circulating throughout the cycle. The purge liquor may be subjected to a treatment for removal of the impurities and recovery of the useful reactants. The other larger fraction L17 is introduced into J where it undergoes a carbonation treatment by the injection of $CO_2$, giving the liquor L14 which is recycled to M for the first washing operation in accordance with the invention, giving the liquor L15 which is recycled to the attack operation at A.

In accordance with another particular arrangement of the process, when the uraniferous ore contains troublesome organic materials, it is put into a divided form and introduced into A with the attack liquor 9 at the same time as oxygen is blown into the reaction medium. After cooling, the slurry produced after the attack operation is introduced into B for separation of a cake S1 formed by the mixture of the sterile fraction and the uranium precipitate, and the aqueous liquor L1 which contains in a dissolved condition alkaline carbonate and bicarbonate, uranium and organic materials which are solubilized in the attack operation.

The mother liquors of cake S1 are displaced in C by means of a recycled washing liquor L11.

The mixture of liquors L1 and L2 is then displaced to H for treatment of the troublesome organic materials by means of an oxidising agent, giving a purified liquor L9.

Referring now to FIG. 5, the unraniferous ore which is in divided form and the recycled attack liquor L9 are introduced into the reaction vessel A at the same time as oxygen is blown into the reaction medium.

The suspension resulting from the attack operation is partly cooled by expansion, with removal of a certain amount of water, and is then introduced into D for redissolution of the uranium precipitate in the liquid phase resulting from the ore attack operation, being supplemented by the recycled liquor L10.

When re-dissolution of the uranium precipitated in the attack operation is concluded, the resulting slurry is treated in E for separation of a cake S3 and a liquor L3.

The cake S3 which essentially comprises sterile matter is placed in M where it undergoes a first washing stage, providing for partial displacement of the impregnation liquor by means of a recycling liquor L14 originating for example from the cycle of treatment of the production liquor L7 containing the uranium which is to be put to use.

The displaced mother liquors form the liquor L15 which is recycled to the ore attack stage.

The resulting cake S15 which is extracted in M is introduced into F for a second washing state using water, with recycling of the washing liquor L4 to D and A, in the form of fractions L10 and L11.

The liquor L3 which is rich in dissolved uranium in the form of an alkaline uranyl carbonate is divided into two unequal fractions, one fraction L6 being recycled to A for the uraniferous ore attack operation while the other larger fraction L7 forms the production liquor from which the uranium is extracted in G by a known process, for example in the form of a sodium uranate.

When the uranium is extracted in the form of sodium uranate, the uranium-rich liquor L3 can be introduced in the form of L7 into I which forms a zone for thermal decomposition of the sodium bicarbonate, which causes $CO_2$ to be given off.

The liquor 12 which is optionally debicarbonated is the introduced into G at the same time as sodium hydroxide (NaOH) to cause precipitation of the sodium uranate.

The slurry produced in G is introduced into K for separation of the solid and liquid phases S13 and L13 respectively.

The solid phase S13 which is formed by sodium uranate is then subjected to various treatments of known type which however are not described herein, for the recovery of a pure uranium compound.

The liquid phase L13 issuing from K is then divided into two unequal fractions. The fraction L16 which is the smaller fraction forms a purge liquor for removing the impurities which are solubilised in the attack operation and for maintaining at substantially constant levels the volume of the liquors and the amount of sodium circulating throughout the cycle. The purge liquor may be subjected to a treatment for removal of the impurities and for recovery of the useful reactants. The other larger fraction L17 is introduced into J where it undergoes a carbonation treatment by the injection of $CO_2$, giving the liquor L20 to which an amount of water is added, giving the liquor L14 which is recycled to M for the first washing operation which provides the liquor L15 which is recycled to the attack operation at A.

In accordance with a particular arrangement, when the uraniferous ore contains troublesome organic materials, it is put into a divided form and is introduced into A with the attack liquor L9 at the same time as oxygen is blown into the reaction medium. After cooling, the slurry produced after the attack operation is introduced into D for re-dissolution of the uranium which is precipitated in the attack operation in the liquid phase resulting from the ore attack step, supplemented by the recycling liquor L10. Conclusion of the operation of re-dissolution of the uranium precipitated in the attack operation is followed by separation of the cake S3 and the liquor L3 which is rich in dissolved uranium in the form of an alkaline uranyl carbonate, being divided into two unequal fractions, one fraction L6 being recycled to the attack operation and the other larger fraction L7 forming the production liquor. The liquor L6 is then displaced to H for treatment of the troublesome organic materials by means of an oxidising agent giving a purified liquor L18 which, when combined with L19, gives the liquor L9 for the ore attack operation.

In accordance with another particular arrangement, it may be advantageous to remove the troublesome organic materials contained in the liquor after the attack operation by treatment in A of the suspension by means of an oxidising agent.

Reference is now made to FIG. 6 which shows another possible form of the process in accordance with the second alternative of the present invention, wherein the uraniferous ore in a divided form and the recycled attack liquor L9 are introduced into the reaction vessel A at the same time as oxygen is blown into the reaction medium.

The suspension resulting from the attack operation is partly cooled by expansion, with a certain amount of water being eliminated, and is then introduced into D for re-dissolution of the uranium precipitate in the liquid phase resulting from the ore attack operation, being supplemented by the recycling liquor L10.

When the operation of re-dissolving the uranium which is precipitated in the attack operation is concluded, the resulting slurry is treated in E for separation of a cake S3 and a liquor L3.

The cake S3 which essentially comprises sterile materials is placed in M where it undergoes a first washing operation, by providing for partial displacement of the impregnation liquor by means of a recycling liquor L21 which is a fraction of L14 originating for example from the cycle of treatment of the production liquor L7 containing uranium to be put to use.

The displaced mother liquors form the liquor L15 which is recycled to G for precipitation of the uranium.

The resulting cake S15 which is extracted in M is introduced into F for a further washing operation with water, with recycling of the washing liquor L4 to D and A, in the form of fractions L10 and L11.

The liquor L3 which is rich in dissolved uranium in the form of an alkaline uranyl carbonate is divided into two unequal fractions, one fraction L6 being recycled to A and the other larger fraction L7 being mixed with L15 to form the production liquor L23 from which the uranium is extracted in G by a known process, for example in the form of a sodium uranate.

When the uranium is extracted in the form of sodium uranate, the uranium-rich liquor L23 can be introduced into I which forms a sodium bicarbonate thermal decomposition zone, with $CO_2$ being given off.

The debicarbonated liquor L12 is then introduced into G at the same time as sodium hydroxide (NaOH) to cause precipitation of the sodium uranate.

The slurry produced in G is introduced into K for separation of the solid and liquid phases S13 and L13 respectively.

The solid phase S13 which is formed by sodium uranate is then subjected to various treatments of known type which however are not described herein, for recovery of a pure uranium compound.

The liquid phase L13 issuing from K is then divided into two unequal fractions. The smaller fraction L16 forms a purge liquor for removing the impurities which are solubilised in the attack operation and for maintaining at substantially constant values the volume of the liquors and the amount of sodium circulating throughout the cycle. The purge liquor may be subjected to treatment for removal of the impurities and recovery of the useful reactants. The other larger fraction L17 is introduced into J where it is subjected to a carbonation treatment by the injection of $CO_2$, giving the liquor L14 which is recycled to M and A in the form of liquid fractions L21 and L27.

When the uraniferous ore contains organic materials, it is desirable for them to be removed from the attack cycle by a suitable treatment such as for example in H of the liquor L6, as already described above with reference to FIG. 1.

The advantages of the process according to the invention will be more clearly apparent from the examples which are given by way of illustration.

Example 1 shows the influence of the temperature of the attack medium on the solubility of the uranium, when the concentration in respect of attack reactants is maintained at a constant value.

Example 2 shows the process of the invention when applied to an ore which is virtually devoid of organic materials.

Example 3 concerns the use of the process in relation to a uraniferous ore containing troublesome organic materials, without treatment for removal of such impurities.

Example 4 illustrates the use of the process in relation to a uraniferous ore containing troublesome organic materials, including a treatment for removing such materials on the liquor which is recycled to the attack operation.

Example 5 shows the attack on a uraniferous ore containing troublesome organic materials in accordance with the process of the invention, with a treatment for removing said organic materials, on the suspension from the attack operation.

Example 6 illustrates the use of the first alternative form of the process of the invention, comprising two washing stages, after separation of the solid and liquid phases.

Example 7 illustrates use of the second alternative form of the process according to the invention, comprising re-dissolution of the uranium which is precipitated in the attack operation in the liquid phase of the cooled suspension after the attack operation.

EXAMPLE 1

In this Example, the applicants show that, when a uraniferous ore is attacked by means of an attack liquor having the same reactant concentration, the solubility of the uranium in the attack liquor decreases when the temperature of the medium rises.

Under laboratory conditions, 1 liter of an aqueous liquor containing 50 g/l of $Na_2CO_3$, 80 g/l of $NaHCO_3$ and 15 g/l of uranium, in a dissolved condition, were maintained at variable temperatures for a period of 2 hours in regard to each temperature, in order to determine the uranium solubility equilibrium, under such conditions.

The concentration of uranium in the liquor is measured at the end of that period of time, giving the results set forth below in Table I:

TABLE I

| | | | | |
|---|---|---|---|---|
| Temperature of the uraniferous liquor | 220° C. | 150° C. | 90° C. | 50° C. |
| Solubility of uranium in the liquor in g/l | 1.8 | 5.2 | 7.8 | 10 |

This Table makes it possible to verify the attraction of performing the uraniferous ore attack operation at the highest possible temperature, in order to promote precipitation of the uranium within the solid fraction. EXAMPLE 2 (illustrated by FIG. 1)

A uraniferous ore having the following composition expressed in percent by weight, after drying, was treated in accordance with the process of the invention:

| | |
|---|---|
| uranium | 0.206% |
| molybdenum | 0.06% |
| $SiO_2$ | 62.30% |
| $Al_2O_3$ | 13.80% |
| $Fe_2O_3$ | 4.1% |
| MgO | 0.34% |
| CaO | 0.59% |
| $Na_2O$ | 7.19% |
| $K_2O$ | 0.47% |
| $TiO_2$ | 0.46% |
| $P_2O_5$ | 0.07% |
| $V_2O_5$ | 0.01% |
| S | 0.12% |
| various | 10.284% (including $CO_2$ 0.85% and organic C 0.108%) |

1000 kg of this dry ore was crushed to a size of 160 μm and then introduced into an autoclave A with 1234 kg of an aqueous attack liquor L9 of the following composition:

| U | 3.50 g/l |
|---|---|
| $Na_2CO_3$ | 43.30 g/l |
| $NaHCO_3$ | 69.40 g/l |
| $Na_2SO_4$ | 11.00 g/l |
| Mo | 6.90 g/l |

The autoclave was heated in such a way that the reaction medium is at a temperature of 220° C., while injecting oxygen at an average flow rate of 0.7 $Nm^3$/hour which bubbled into the pulp. The total pressure obtaining in the autoclave during the oxidising attack operation was 35 bars.

After a residence time of 40 minutes at 220° C. (the time elapsed between the beginning of the operation of introducing oxygen and the end of the attack operation), the slurry was expanded and cooled to a temperature of 60° C., with 78.8 kg of water being given off in the form of vapour, and was then filtered in B after the addition of 50 kg of aqueous flocculating agent suspension, giving a solid phase S1 and a liquid phase L1.

The liquor L1 from the separation step in B represented a mass of 842 kg, and was of the following composition:

| U | 3.55 g/l |
|---|---|
| $Na_2CO_3$ | 38.30 g/l |
| $NaHCO_3$ | 57.80 g/l |
| $Na_2SO_4$ | 10.70 g/l |
| Mo | 6.14 g/l |

The solid phase S1 formed by the mixture of the sterile fraction and the sodium uranyl carbonate precipitate was impregnated with mother liquors which were extracted in C by means of 309 kg of an aqueous recycling liquor L11 of the following composition:

| U | 2.35 g/l |
|---|---|
| $Na_2CO_3$ | 3.50 g/l |
| $NaHCO_3$ | 17.60 g/l |
| $Na_2SO_4$ | 3.30 g/l |
| Mo | 1.88 g/l |

The S1 impregnation mother liquors which are thus entrained gave a liquor L2 representing a mass of 322 kg, of the following composition:

| U | 3.99 g/l |
|---|---|
| $Na_2CO_3$ | 43.0 g/l |
| $NaHCO_3$ | 64.80 g/l |
| $Na_2SO_4$ | 12.0 g/l |
| Mo | 6.88 g/l | which was combined with L1, giving a liquor L5 which is recycled to the ore attack operation in A.

The solid phase S1 from which the impregnation mother liquors were removed gave a cake S2 which was transferred into D for re-dissolution therein of the sodium uranyl carbonate precipitate.

The cake S2 which weighed 1325 kg contained, in kg:

| U | 2.78 kg |
|---|---|
| $Na_2CO_3$ | 3.10 kg |
| $NaHCO_3$ | 20.40 kg |
| $Na_2SO_4$ | 3.80 kg |
| Mo | 2.17 kg |

| Impregnation $H_2O$ | 298.00 kg |
|---|---|
| Sterile matter | 995.00 kg |

The cake S2 was then treated in D with the mixture of 2 aqueous liquors L10 and L6.

The liquor L10 weighed 206 kg and was of the same composition as the liquor L11 which was used for displacement in C of the impregnation mother liquor.

The recycling liquor L6 represented a mass of 210 kg and was of the following composition in g/l:

| U | 3.88 g/l |
|---|---|
| $Na_2CO_3$ | 5.80 g/l |
| $NaHCO_3$ | 29.10 g/l |
| $Na_2SO_4$ | 5.40 g/l |
| Mo | 3.10 g/l |

When re-dissolution of the sodium uranyl carbonate was concluded, the resulting slurry was displaced to E for separation of a cake S3 and an aqueous liquor L3.

The mother liquor-impregnated cake S3 was treated in F where it was subjected to a washing operation with 800 kg of water, with recycling of the liquor L4 which was then divided into the liquor L10 for re-dissolution of the uranium in D and the liquor L11 for displacement of the liquor impregnating the solid phase S1, in C.

The cake S4 representing a water-impregnated mass of 1290 kg was discharged from F. The cake S4 has a residual uranium content of 60 ppm, containing 295 kg of impregnation water, the remainder being the weight of the sterile matter.

734 kg of the liquor L3 for re-dissolution of the sodium uranyl carbonate was collected at the discharge of E.

The liquor L3 was divided into two unequal fractions:
- one fraction, being the liquor L6, representing a mass of 210 kg, was recycled to D, as already stated above,
- the other fraction, liquor L7, representing a mass of 524 kg, constituted the production of liquor which was passed to G and from which the uranium was extracted by a process (not described herein), while the resulting liquor L8 from which the impurities have been removed was recycled to the attack operation at A in order to form, with the liquor L5, the above-mentioned attack liquor L9.

EXAMPLE 3 (illustrated by FIG. 1)

Using the process of the invention, a uraniferous ore of the following composition expressed in percent by weight after drying was attacked:

| U | 0.360% |
|---|---|
| $SiO_2$ | 49.80% |
| $Al_2O_3$ | 15.60% |
| $Fe_2O_3$ | 6.56% |
| MgO | 3.05% |
| CaO | 4.30% |
| $Na_2O$ | 3.25% |
| $K_2O$ | 0.20% |
| $TiO_2$ | 0.79% |
| Mo | 0.063% |
| S | 0.41% |
| Various | 15.617% |
| (including $CO_2$ = 9% and organic C = 0.205%) | |

Three tests were carried out under laboratory conditions to show the harmful influence of the increase in the proportion of organic materials in the attack medium, without the production liquor L7 being treated and without the liquor L8 being recycled.

For each test, 750 g of the above-mentioned dried ore was attacked, being crushed to a grain size of less than 160 μm, in the autoclave A, with 802.5 g of an attack liquor L9 containing 20 g/l of $Na_2CO_3$ and 125 g/l of $NaHCO_3$.

The autoclave was heated in such a way that the reaction medium is at a temperature of 220° C., while injecting oxygen at a mean flow rate of 35 Nl/hour, which bubbled into the pulp. The pressure during the attack operation was 35 bars.

After a residence time of 30 minutes, which was the time elapsed between the beginning of the operation of introducing oxygen and the end of the attack operation, the slurry was cooled to a temperature of 50° C. and then filtered in B, giving a solid phase S1 and a liquid phase L1.

The first test consisted of attacking the above-mentioned ore, in accordance with the conditions described, by means of the liquor L9 which is free from organic materials.

The mother liquor L1 from the separation operation B represented a mass of 570 g.

The cake S1 was washed in C by means of 200 g of water (L11), giving S2, so as by displacement to produce a washing liquor L2 which is of substantially the same mass (200 g) and which is similar in composition to the mother liquor L1.

The cake S2 containing the sterile matter and the sodium carbonate uranyl crystals was then treated in D with 500 g of water, giving a cake S3 which essentially comprises the sterile matter and a production liquor L3 containing the uranium in solution.

The operation of washing the sterile matter was carried out in a number of stages using 2800 g of water. The compositions of the liquors L1, L2 and L3 are summarised in Table 2 below.

The uranium content of the washed and dried sterile materials was 130 ppm, corresponding to an attack efficiency of 96.4%.

The second test consisted of attacking 750 g of the above-mentioned ore by means of an attack liquor L9 formed by the mixture of liquors L1 and L2 of the first test, the mixture being re-adjusted in respect of carbonated reactants and water to produce 750 milliliters of the attack liquor, representing a mass of 810 g, and including in solution 20 gl of $Na_2CO_3$ and 125 g/l of $NaHCO_3$, and also 4.2 g/l of organic impurities solubilised in the previous attack operation, as expressed in respect of D.C.O. and as measured in accordance with standard AFNOR NF T 90-101 of September 1971.

The conditions in respect of ore attack, washing and re-dissolution of the sodium uranyl carbonate precipitate are the same as in the first test.

The compositions of the liquors L1, L2 and L3 collected are summarised in Table 2 below. The uranium content of the washed and dried sterile substances was 340 ppm, corresponding to an efficiency in respect of uranium solubilisation of 90.60%.

The third test consisted of attacking the above-mentioned uraniferous ore under the same conditions as those of tests 1 and 2, but by means of an attack liquor L1 comprising a mixture of liquors L1 and L2 from the second test, with re-adjustment in respect of water and reactants to produce 750 milliliters of an attack liquor representing a mass of 810 g and comprising, in solution, 20 gl of $Na_2CO_3$ and 125 g/l of $NaHCO_3$, and also 6.4 g/l of organic impurities.

The compositions of the liquors L1, L2 and L3 collected are set forth in Table 2 below. The uranium content of the washed and dried sterile materials was 495 ppm, corresponding to an attack efficiency of 86.2%.

TABLE II

|  | Test 1 | Test 2 | Test 3 |
|---|---|---|---|
| Composition of the liquors L1 (in g/l) | | | |
| U | 3.75 | 4.2 | 3.9 |
| $Na_2CO_3$ | 21.6 | 17.2 | 16.1 |
| $NaHCO_3$ | 73.2 | 72.9 | 73.7 |
| Organic materials | 4.8 | 6.8 | 7.2 |
| Composition of the liquor L2 from the first washing operation (in g/l) | | | |
| U | 2.78 | 3.75 | 4.8 |
| $Na_2CO_3$ | 17.4 | 16.1 | 16.3 |
| $NaHCO_3$ | 56.3 | 63.5 | 73.9 |
| Organic materials | 4.5 | 6.3 | 6.6 |
| Composition of the liquor L3 (in g/l) | | | |
| U | 0.44 | 1.59 | 2.59 |
| $Na_2CO_3$ | 1.86 | 2.1 | 1.65 |
| $NaHCO_3$ | 2.62 | 6.2 | 8.84 |
| Organic materials | 1.0 | 1.4 | 1.8 |
| Uranium content of the sterile materials (ppm) | 130 | 340 | 495 |
| Attack efficiency (%) | 96.4 | 90.6 | 86.2 |

These three tests thus made it possible to establish that the enrichment in respect of organic materials in the ore attack liquor resulted in a substantial reduction in the level of efficiency of uranium solubilisation.

EXAMPLE 4 (illustrated by FIG. 2)

The same mass of the same uraniferous ore as that described in Example 3 was subjected to attack in accordance with the process of this invention.

Three tests were carried out under laboratory conditions to show the beneficial influence of oxidation of the organic materials present in the attack liquor L9, without the production liquor L7 being treated and without the liquor L8 being recycled.

Tests 4, 5 and 6 consisted of attacking the above-mentioned uraniferous ore in accordance with the mode of operation described in Example 3, but with oxidation of the organic materials present in the liquor L5, a mixture of liquors L1 and L2, before recycling it to the attack operation. The attack liquor L9 was prepared for tests 4, 5 and 6 in accordance with the process set forth in Example 3.

Oxidation of the organic materials was carried out in H, on the liquor L5 from stages B and C.

For this purpose, 750 ml of the liquor L5 which was re-adjusted in respect of reactants and water, representing a mass of 810 g and of the following composition, was introduced into H:

| | |
|---|---|
| U | 2.6 g/l |
| $Na_2CO_3$ | 25.0 g/l |
| $NaHCO_3$ | 120.0 g/l |
| Organic materials | 4.8 g/l |

The liquor L5 was then treated at boiling point for 20 minutes by means of sodium persulphate which was added to the liquor L5 in a proportion of 10 g/l of liquor to be treated.

The compositions of the different liquors and the uranium contents of the sterile materials produced after each of the attack operations 4, 5 and 6 are set forth in Table 3 below.

TABLE III

|  | Test 4 | Test 5 | Test 6 |
|---|---|---|---|
| Composition of the liquors L1 (in g/l) | | | |
| U | 2.97 | 2.68 | 2.59 |
| $Na_2CO_3$ | 14.84 | 13.8 | 18.0 |
| $NaHCO_3$ | 75.6 | 71.1 | 66.4 |
| Organic materials | 4.3 | 4.9 | 5.4 |
| Composition of the liquor L2 from the first washing operation (in g/l) | | | |
| U | 2.59 | 3.75 | 3.48 |
| $Na_2CO_3$ | 14.2 | 13.4 | 16.3 |
| $NaHCO_3$ | 65.2 | 68.7 | 56.8 |
| Organic materials | 3.8 | 5.4 | 5.3 |
| Composition of the liquor L3 (in g/l) | | | |
| U | 0.62 | 3.93 | 4.64 |
| $Na_2CO_3$ | 2.16 | 2.54 | 1.57 |
| $NaHCO_3$ | 5.44 | 13.0 | 13.5 |
| Organic materials | 1.3 | 1.6 | 2.0 |
| Uranium content of the sterile materials (ppm) | 115 | 120 | 80 |
| Attack efficiency (%) | 96.8 | 96.7 | 97.8 |

It is noted that the uranium contents in the sterile materials have not increased, unlike the amounts which were obtained after the successive attack operations performed without purification treatment of the organic materials. The uranium contents were of the order of 100 ppm, which corresponds to a mean U solubilisation efficiency of 97%, in these tests. It was also established that the uranium concentration of the liquor L3 reached 4.6 g/l after the third attack operation (test 6) and that the liquor L3 contained only 1.6 g/l of $Na_2CO_3$ and 13.5 g/l of $NaHCO_3$, which is highly favourable in regard to further treatment of that liquor.

EXAMPLE 5 (illustrated in FIG. 3)

The same mass of the same uraniferous ore as described in Example 3 was attacked in accordance with the process of the invention.

Three attack operations were carried out (tests 7, 8 and 9) to show the beneficial influence of oxidation of the organic materials, the oxidation operation being carried out in A on the suspension produced in the attack operation, without the production liquor L7 being treated and without the liquor L8 being recycled.

The conditions in respect of temperature, pressure, duration and oxygen injection were the same as described in Example 3, and the attack liquor L9 in each of the tests was prepared using the procedure described in Example 3.

Oxidation in A of the organic materials in the suspension after the attack operation was performed by means of sodium persulphate, under the conditions set forth in Example 4.

The compositions of the different liquors and the uranium contents of the sterile materials, produced after each of attack operations 7, 8 and 9, are combined in Table 4 below:

TABLE IV

|  | Test 7 | Test 8 | Test 9 |
|---|---|---|---|
| Composition of the liquor L1 (in g/l) | | | |
| U | 2.59 | 2.50 | 2.50 |
| $Na_2CO_3$ | 15.9 | 10.0 | 12.7 |
| $NaHCO_3$ | 67.7 | 68.0 | 66.0 |
| Organic materials | 2.3 | 2.6 | 3.0 |
| Composition of the liquor L2 from the first washing operation (in g/l) | | | |
| U | 3.8 | 2.76 | 2.8 |
| $Na_2CO_3$ | 14.84 | 10.4 | 12.7 |
| $NaHCO_3$ | 60.0 | 62.8 | 60.1 |
| Organic materials | 2.1 | 2.6 | 2.7 |
| Composition of the liquor L3 (in g/l) | | | |
| U | 4.3 | 4.48 | 4.66 |
| $Na_2CO_3$ | 2.3 | 1.57 | 2.12 |
| $NaHCO_3$ | 12.7 | 13.0 | 15.3 |
| Organic materials | 2.3 | 3.6 | 3.7 |
| Uranium content of the sterile materials (ppm) | 85 | 110 | 105 |
| Attack efficiency (%) | 97.6 | 96.9 | 97.1 |

It was established that the results were little different from those obtained in tests 4, 5 and 6: the uranium content of the sterile materials has remained substantially constant and on average was 100 ppm. Likewise, the uranium concentration in the liquor L3 remained stable, in the region of 4.5 g/l.

Thus, the treatment for removing organic impurities in the recycled liquors which are introduced into the attack operation appears to be highly attractive in regard to obtaining a satisfactory level of uranium solubilisation efficiency. This treatment may be performed either on the pulp produced after the the attack operation or on the liquor which is introduced into the attack step.

EXAMPLE 6 (illustrated in FIG. 4)

A uraniferous ore having the following composition expressed in % by weight after drying was treated in accordance with the process of the invention:

| Uranium | 0.093% | |
| Molybdenum | 0.005% | |
| $SiO_2$ | 68.5% | |
| $Al_2O_3$ | 12.1% | |
| $Fe_2O_3$ | 4.3% | |
| MgO | 0.5% | |
| CaO | 3.4% | |
| $Na_2O$ | 2.5% | |
| $K_2O$ | 0.1% | |
| $TiO_2$ | 0.6% | |
| S | 0.03% | |
| Various | 7.872% | (including 3.22% of $CO_2$) |

1015 kg of this ore, with a moisture content of 1.5%, was crushed to a grain size of 160 μm and then introduced into an attack reaction vessel A with 1277 kg of liquor L9 with a specific gravity of 1.13.

The liquor L9 was of the following composition:

| Uranium | 3.38 g/l |
| $Na_2CO_3$ | 50.0 g/l |
| $NaHCO_3$ | 80.0 g/l |
| $Na_2SO_4$ | 10.9 g/l |

The reaction vessel was heated in such a way that the reaction medium is at a temperature of 220° C., while oxygen is injected at a mean flow rate of 2 $Nm^3$/hour, the oxygen bubbling into the pulp. The total pressure obtaining in the reaction vessel during the oxidising attack operation was 35 bars.

After a residence time of 30 minutes at a temperature of 220° C. (time elapsed between the beginning of the operation of introducing oxygen and the end of the attack operation), the slurry was allowed to expand and cooled to 60° C., with 113.3 kg of water being given off in the form of vapour, as well as 1.02 Nm³ of $CO_2$ and 0.4 Nm³ of oxygen, which had not reacted. The slurry was then filtered in B after the addition of 30 kg of aqueous suspension of flocculating agent, giving a solid phase S1 and a liquid phase L1.

The liquor L1 from the separation operation in B represented a mass of 825 kg and had a specific gravity of 1.13, while its composition was as follows:

| | | |
|---|---|---|
| | Uranium | 3.73 g/l |
| | $Na_2CO_3$ | 45.0 g/l |
| | $NaHCO_3$ | 76.2 g/l |
| | $Na_2SO_4$ | 11.2 g/l |

The solid phase S1 formed by the mixture of the sterile fraction and the sodium uranyl carbonate precipitate was impregnated with mother liquors, in a proportion of 25.5% by weight. The cake S1 was transferred to D for re-dissolution therein of the sodium uranyl carbonate precipitate.

The cake S1 which had a mass of 995 kg of dry matter and 341 kg of impregnation liquor contained, in kilograms:

| | | |
|---|---|---|
| | Uranium | 1.476 kg |
| | $Na_2CO_3$ | 13.49 kg |
| | $NaHCO_3$ | 22.85 kg |
| | $Na_2SO_4$ | 3.368 kg |
| | $H_2O$ | 300.00 kg |

The cake S1 was then treated in D by the mixture of two aqueous liquors L10 and L6.

The liquor L10 which represented a mass of 380 kg had a specific gravity of 1.05, and was of the following composition:

| | | |
|---|---|---|
| | Uranium | 0.26 g/l |
| | $Na_2CO_3$ | 34.2 g/l |
| | $NaHCO_3$ | 44.1 g/l |
| | $Na_2SO_4$ | 3.9 g/l |

The liquor L6, being a recycling liquor, represented a mass of 385 kg, had a specific gravity of 1.06, and was of the following composition:

| | | | |
|---|---|---|---|
| | Uranium | 2.16 | g/l |
| | $Na_2CO_3$ | 35.5 | g/l |
| | $NaHCO_3$ | 53.4 | g/l |
| | $Na_2SO_4$ | 6.4 | g/l |

When re-dissolution of the sodium uranyl carbonate was concluded, the resulting slurry was displaced to E where, after the introduction of 50 liters of aqueous flocculating agent suspension, the operation of separating a cake S3 and an aqueous liquor L3 was performed.

The mother liquor-impregnated cake S3 was introduced into a first washing zone M in which it was subjected to a washing operation by means of 363 kg of an aqueous recycling liquor L14 which had a specific gravity of 1.1 and which was of the following composition:

| | | |
|---|---|---|
| | Uranium | 0.032 g/l |
| | $Na_2CO_3$ | 57.2 g/l |
| | $NaCHO_3$ | 72.6 g/l |
| | $Na_2SO_4$ | 6.0 g/l |

At the discharge of M, 390 kg of a liquor L15 which was recycled to the ore attack operation in A was collected. The liquor L15 had a specific gravity of 1.1 and was of the following composition:

| | | |
|---|---|---|
| | Uranium | 1.62 g/l |
| | $Na_2CO_3$ | 45.8 g/l |
| | $NaHCO_3$ | 64.4 g/l |
| | $Na_2SO_4$ | 6.9 g/l |

The cake S15 representing a liquor-impregnated mass of 1328 kg was introduced into the second washing zone F. The impregnation liquor represented a mass of 333 kg, had a specific gravity of 1.09, and was of the following composition:

| | | |
|---|---|---|
| | Uranium | 0.35 g/l |
| | $Na_2CO_3$ | 44.9 g/l |
| | $NaHCO_3$ | 58.2 g/l |
| | $Na_2SO_4$ | 5.1 g/l |

The cake S15 was washed by means of 350 kg of water and, after the second washing operation, represented a mass of 1298 kg which was impregnated with impregnation liquor, and was discharged from P. This liquor represented a mass of 303 kg, had a specific gravity of 1.02, and was of the following composition:

| | | |
|---|---|---|
| | Uranium | 0.036 g/l |
| | $Na_2CO_3$ | 4.6 g/l |
| | $NaHCO_3$ | 5.95 g/l |
| | $Na_2SO_4$ | 0.54 g/l |

The cake was formed by the mass of sterile materials and contained 30 ppm of uranium which had not been solubilised in the attack operation.

The liquor L4 issuing from the second washing zone was recycled in its entirety into the re-dissolution zone D, in the form of liquor L10 whose mass and composition have been specified hereinbefore.

At the discharge from the separation operation E, a liquor L3 was collected, which contained sodium uranyl carbonate in solution and which represented a mass of 823 kg. The liquor L3 was divided into two unequal fractions:

one fraction, being the liquor L6, representing a mass of 385 kg, was recycled to D, as described above;

the other fraction, liquor L7, representing a mass of 438 kg, formed the production liquor which was passed into G and from which the uranium was extracted.

The liquor L7 was directly introduced into G without being subjected first to debicarbonation in I.

Precipitation of the uranium in G was then performed in the presence of sodium uranate starter or primer in a proportion of eight times the amount of uranate produced by the introduction of 14.6 kg of NaOH in the form of a 25.6% NaOH aqueous solution, the aqueous mixture being raised to a temperature of 80° C. during a period of 6 hours.

After that period, a slurry was collected which, when introduced into K for separation of a solid phase S13 formed by sodium uranate which, after separation of the primer or starter, washing and drying, represented a mass of 1.18 kg and a liquid phase L13 representing a mass of 510 kg, with a specific gravity of 1.07, was of the following composition:

|  |  |
|---|---|
| Uranium | 0.028 g/l |
| $Na_2CO_3$ | 92.1 g/l |
| NaOH | 7.6 g/l |
| $Na_2SO_4$ | 5.9 g/l |

The liquor L13 issuing from K was then divided into two liquid fractions. One fraction L16, being the minor fraction, representing a mass of 153 kg, formed a purge. This fraction L16 provides for the quantitative elimination of the impurities which were solubilized at the moment of the attack on the ore, and for holding the volume of the liquors and the amount of sodium circulating in the cycle, at substantially constant values. The other fractions L17, being the major fraction, representing a mass of 357 kg, was introduced into J where it was subjected to a carbonation treatment. For that purpose, the liquor L17 which was at a temperature of 51° C. was carbonated by means of 3.9 $Nm^3$ of $CO_2$ and gave a liquor L14 which was recycled to the first washing zone M, the quantity and the composition of which have been specified above.

EXAMPLE 7 (illustrated in FIG. 5)

A uraniferous ore of the following composition expressed in % by weight after drying was treated in accordance with the process of the invention:

|  |  |
|---|---|
| Uranium | 0.180% |
| Molybdenum | 0.005% |
| $SiO_2$ | 63.5% |
| $Al_2O_3$ | 10.1% |
| $Fe_2O_3$ | 3.6% |
| MgO | 2.1% |
| CaO | 4.5% |
| $Na_2O$ | 4.9% |
| $K_2O$ | 0.2% |
| $TiO_2$ | 0.45% |
| S | 0.10% |
| Various | 10.365% (including 5.85% of $CO_2$) |

1000 kg of this dry ore was crushed to a size of 160 μm and then introduced into the attack reaction vessel A with 1290 kg of the aqueous liquor L9 with a specific gravity of 1.08.

The liquor L9 was of the following composition:

|  |  |
|---|---|
| Uranium | 3.17 g/l |
| $Na_2CO_3$ | 35.2 g/l |
| $NaHCO_3$ | 63.4 g/l |
| $Na_2SO_4$ | 28.2 g/l |

The reaction vessel was heated in such a way that the reaction medium was at a temperature of 220° C., while oxygen was injected at a mean flow rate of 3 $Nm^3$/hour, and bubbled into the pulp. The total pressure obtaining in the reaction vessel during the oxidising attack operation was 35 bars.

After a residence time of 60 minutes at a temperature of 220° C. (the time elapsed between the beginning of the oxygen introducing operation and the end of the attack operation), the slurry was allowed to expand and cooled to 60° C., with 130 kg of water in the form of vapour being given off, together with 1.27 $Nm^3$ of $CO_2$ and 0.4 $Nm^3$ of oxygen, which had not reacted.

The suspension from the attack operation in A was then introduced into D for re-dissolution of the sodium uranyl carbonate in the liquid phase of said suspension, to which there was added 328 kg of the recycling liquor L10, with a specific gravity of 1.04, the composition of which was as follows:

|  |  |
|---|---|
| Uranium | 0.59 g/l |
| $Na_2CO_3$ | 27.3 g/l |
| $NaHCO_3$ | 43.6 g/l |
| $Na_2SO_4$ | 17.5 g/l |

When re-dissolution of the sodium uranyl carbonate was concluded, the resulting slurry was displaced into E where, after the introduction of the aqueous suspension containing 0.5 g/l of flocculating agent, requiring the introduction of 8 kg of water, the slurry was separated into cake S3 and an aqueous liquor L3.

The mother liquor-impregnated cake S3 was introduced into a first washing zone M in which it was subjected to washing by means of 360 kg of an aqueous recycling liquor L14 which had a specific gravity of 1.08 and which was of the following composition:

|  |  |
|---|---|
| Uranium | 0.023 g/l |
| $Na_2CO_3$ | 46.9 g/l |
| $NaHCO_3$ | 75.0 g/l |
| $Na_2SO_4$ | 27.5 g/l |

At the discharge of M, there was collected 426 kg of a liquor L15 which was recycled to the ore attack operation in A.

The liquor L15 had a specific gravity of 1.10 and was of the following composition:

|  |  |
|---|---|
| Uranium | 3.34 g/l |
| $Na_2CO_3$ | 37.85 g/l |
| $NaHCO_3$ | 67.90 g/l |
| $Na_2SO_4$ | 30.20 g/l |

The cake S15 represented a mass of 1356 kg wherein the impregnation liquor represented a mass of 361 kg, which had a specific gravity of 1.08 and which was of the following composition:

|  |  |
|---|---|
| Uranium | 0.98 g/l |
| $Na_2CO_3$ | 45.7 g/l |
| $NaHCO_3$ | 75.7 g/l |
| $Na_2SO_4$ | 29.3 g/l |

The cake S15 was then washed in F by means of 500 kg of water, giving S4 which, after the second washing operation, represented a liquor-impregnated mass of 1286 kg. The impregnation liquor L4 was discharged from F, represented a mass of 570 kg, had a specific gravity of 1.04, and was of the following composition:

|  |  |
|---|---|
| Uranium | 0.586 g/l |
| $Na_2CO_3$ | 27.2 g/l |
| $NaHCO_3$ | 45.1 g/l |

-continued

| | |
|---|---|
| Na$_2$SO$_4$ | 17.5 g/l |

The cake S4 was formed by the mass of sterile materials, which contained 54 ppm of uranium which had not been solubilized in the attack operation, and by the impregnation liquor which weighed 291 kg and which was of the following composition:

| | |
|---|---|
| Uranium | 0.028 g/l |
| Na$_2$CO$_3$ | 1.32 g/l |
| NaHCO$_3$ | 2.18 g/l |
| Na$_2$SO$_4$ | 0.84 g/l |

The liquor L4 from the second washing operation was recycled in part to the re-dissolution zone D in the form of L10, and in part to the ore attack operation in A, in the form of L11.

As already stated, a liquor L3 was collected at the discharge from the separation step in E, said liquor containing sodium uranyl carbonate in solution and representing a mass of 1085 kg, with a specific gravity of 1.08 and with the following composition:

| | |
|---|---|
| Uranium | 4.08 g/l |
| Na$_2$CO$_3$ | 36.6 g/l |
| NaHCO$_3$ | 67.3 g/l |
| Na$_2$SO$_4$ | 31.2 g/l |

The liquor L3 was divided into two unequal fractions:
one fraction, being the liquor L6, representing a mass of 623 kg, was recycled to A,
the other fraction, liquor L7, representing a mass of 462 kg, formed the production liquor which was passed into G and from which the uranium was extracted.

The liquor L7 was introduced into I where, by a heat treatment at a temperature of 105° C. for a period of 0.50 hour, it underwent debicarbonation which was revealed by the removal of 5.4 Nm$^3$ of CO$_2$ and 53 kg of water.

A liquor L12 was produced at the discharge from I, representing a mass of 399 kg, with a specific gravity of 1.08, and of the following composition:

| | |
|---|---|
| Uranium | 4.73 g/l |
| Na$_2$CO$_3$ | 76.7 g/l |
| NaHCO$_3$ | 23.4 g/l |
| Na$_2$SO$_4$ | 36.0 g/l |

The liquor L12 was then passed into G.
Precipitation of the uranium in G was carried out, in the presence of sodium uranate in a proportion of eight times the amount of uranate precipitated, by the introduction of 7.9 kg of NaOH in the form of a 49.7% NaOH aqueous solution, the aqueous mixture being raised to a temperature of 80° C. for a period of six hours.

At the end of that period of time, there was collected a slurry which was introduced into K for separation of a solid phase S13 formed by sodium uranate which, after separation of the primer or starter, washing with 7 kg of water and drying, represented a mass of 1.736 kg of uranium, and a liquid phase L13 representing a mass of 418 kg, with a specific gravity of 1.08, and of the following composition:

| | |
|---|---|
| Uranium | 0.028 g/l |
| Na$_2$CO$_3$ | 107.2 g/l |
| NaOH | 7.4 g/l |
| Na$_2$SO$_4$ | 34.4 g/l |

The liquor L13 issuing from K was then divided into two liquid fractions. One fraction L16, being the minor fraction, representing a mass of 130 kg, constituted a purge. The fraction L16 provides for the quantitative elimination of the impurities which were solubilised at the moment of the attack on the ore, and for holding the volume of the liquors and the amount of sodium circulating in the cycle at a substantially constant level. The other fraction L17, being the major fraction, representing a mass of 288 kg, was introduced into J where it was subjected to a carbonation treatment.

For that purpose, the liquor L17 which was at a temperature of 50° C. was carbonated by means of 3.9 Nm$^3$ of CO$_2$, giving 296 kg of a liquor L20 with a specific gravity of 1.09, and of the following composition:

| | |
|---|---|
| Uranium | 0.028 g/l |
| Na$_2$CO$_3$ | 57.2 g/l |
| NaHCO$_3$ | 92.2 g/l |
| Na$_2$SO$_4$ | 33.9 g/l |

64.0 kg of water was then added to the liquor L20, giving the liquor L14 which represented a mass of 360 kg, had a specific gravity of 1.08, and was of the following composition:

| | |
|---|---|
| Uranium | 0.023 g/l |
| Na$_2$CO$_3$ | 46.5 g/l |
| NaHCO$_3$ | 75.0 g/l |
| Na$_2$SO$_4$ | 27.5 g/l |

The liquor L14 was then recycled to M for washing of the above-mentioned cake S15.

We claim:
1. A continuous process for attack of uraniferous ore for the recovery of uranium values comprising
(a) attacking the uraniferous ore in divided form by means of an attack liquor of alkaline carbonate and bicarbonate and uranium in a concentration close to its limit of solubility and at a temperature within the range of 40°–300° C., in the presence of an oxidizing agent for dissolution of uranium values present in the ore,
(b) directing the suspension resulting from the attack on the uraniferous ore of step (a) to another vessel,
(c) cooling the suspension to a temperature which does not go below 40° C. to divide the suspension into a solid phase containing the uranium values and sterile material and a liquid phase,
(d) separating the solid phase from the liquid phase of the suspension of step (c),
(e) treating the separated solid phase with an aqueous liquor to redissolve the uranium values and to recover the liquid phase entrained with the separated solid material, and
(f) separating the slurry from step (e) into a solid sterile material and a useful uraniferous liquor from which the uranium values may be recovered.

2. A continuous process as claimed in claim 1 in which the aqueous liquor of step (e) contains 0 to 15 g/l $CO_3^=$, 0 to 50 g/l $HCO_3^-$ and 0 to 10 g/l uranium values.

3. A continuous process as claimed in claim 1 in which the alkaline carbonate and bicarbonate in the attack liquor are alkali metal carbonates in which the alkali metal is selected from the group consisting of sodium, potassium and ammonium.

4. A continuous process as claimed in claim 1 in which the oxidizing agent is a gaseous medium selected from the group consisting of air, oxygen-enriched air, and pure oxygen at a partial pressure of oxygen within the range of 0.1 to 40 bars.

5. A continuous process as claimed in claim 4 in which the partial pressure is within the range of 5 to 15 bars.

6. A continuous process as claimed in claim 1 in which the attack is carried out with the attack liquor at a temperature within the range of 120°–240° C.

7. A continuous process as claimed in claim 1 in which the $HCO_3^-$ is present in the attack liquor in a concentration within the range of 0 to 220 g/l and the $CO_3^=$ is present in a concentration within the range of 10 to 90 g/l.

8. A continuous process as claimed in claim 1 in which the $HCO_3^-$ is present in the attack liquor in a concentration within the range of 15 to 80 g/l and the $CO_3^=$ is present in a concentration within the range of 20 to 60 g/l.

9. A continuous process as claimed in claim 1 which includes the step of recycling a portion of the liquor separated from the redissolution of the uranium values in step (e) to the attack liquor of step (a).

10. A process as claimed in claim 9 which includes a step of subjecting the recycled liquor to oxidation to eliminate organic material contained therein.

11. A process as claimed in claim 1 which includes the step of subjecting the suspension of step (b) to oxidation to destroy organic material contained in the suspension.

12. A process as claimed in claim 1 which includes the step of washing the separated solid phase with an aqueous solution to provide a solution having a low content of soluble uranium values.

13. A process as claimed in claim 12 which includes the step of combining the wash liquor with the liquor separated in step (b) of claim 1 and adding this stream to the liquor for attack of the uraniferous ore of step (a) of claim 1.

14. A process as claimed in claim 13 in which the wash liquor contains 5 to 170 g/l $CO_3^=$ and 90 to 0 g/l $HCO_3^-$.

15. A process as claimed in claim 13 in which the wash liquor contains 10 to 60 g/l $CO_3^=$ and 75 to 10 g/l $HCO_3^-$.

16. A process as claimed in claim 13 which includes the step of washing the solid phase separated from the suspension in step (d) of claim 1 before treatment to redissolve the uranium values with the aqueous liquor in step (e) of claim 1.

17. A process as claimed in claim 12 in which the separated solid phase is washed a second time with an aqueous medium which is then directed to the attack step.

18. A process as claimed in claim 17 in which the second stage wash liquor contains 5 to 45 g/l $CO_3^=$ and 0 to 80 g/l $HCO_3^-$.

19. A process as claimed in claim 17 in which the second stage wash liquor contains 10 to 30 g/l $CO_3^=$ and 10 to 40 g/l $HCO_3^-$.

20. A process as claimed in claim 1 which includes the step of dividing the liquid phase from step (d) of claim 1 into two fractions, recycling one fraction to the attack liquor and the other fraction to the recovery of uranium values contained therein.

21. A process as claimed in claim 1 in which the aqueous liquor from process step (e) contains 5 to 45 g/l $CO_3^=$ and 0 to 80 g/l $HCO_3^-$.

22. A process as claimed in claim 1 in which the aqueous liquor from process step (e) contains 10 to 30 g/l $CO_3^=$ and 10 to 40 g/l $HCO_3^-$.

23. A process as claimed in claim 12 in which the washing step uses an aqueous solution containing 5 to 170 g/l $CO_3^=$ and 90 to 0 g/l $HCO_3^-$.

24. A process as claimed in claim 12 in which the washing step uses an aqueous solution containing 10 to 60 g/l $CO_3^=$ and 75 to 10 g/l $HCO_3^-$.

25. The process as claimed in claim 1 which includes the step of washing with water the solid phase after it has been separated the aqueous solution in step (f) of claim 1.

26. The process as claimed in claim 23 or 24 which includes the step of recycling the wash liquor in whole or in part, to the attack liquor.

27. A process as claimed in claim 1 in which the liquor separated from the solid phase from step (d) of claim 1 is separated into fractions, one of which is recycled to the attack liquor and another of which is directed to the redissolution of the uranium values in step (e) of claim 1.

28. A continuous process for attack of uraniferous ore for the recovery of uranium values comprising
(a) attacking the uraniferous ore in divided form by means of an attack liquor of alkaline carbonate and bicarbonate and uranium in a concentration close to its limit of solubility and at a temperature within the range of 40°–300° C., in the presence of an oxidizing agent for dissolution of uranium values present in the ore,
(b) cooling the suspension resulting from the attack on the uraniferous ore of step (a) to a temperature which does not go below 40° C. to divide the suspension into a solid phase containing the uranium values and sterile material and a liquid phase,
(c) treating the suspension with an aqueous liquor to redissolve the uranium values and to recover the liquid phase entrained with the separated solid material, and
(d) separating the suspension from step (c) into a solid sterile material and a useful uraniferous liquor from which the uranium values may be recovered.

29. A continuous process as claimed in claim 28 in which the aqueous liquor of step (c) contains 0 to 15 g/l $CO_3^=$, 0 to 50 g/l $HCO_3^-$ and 0 to 10 g/l uranium values.

30. A continuous process as claimed in claim 28 in which the alkaline carbonate and bicarbonate in the attack liquor are alkali metal carbonates in which the alkali metal is selected from the group consisting of sodium, potassium and ammonium.

31. A continuous process as claimed in claim 28 in which the oxidizing agent is a gaseous medium selected from the group consisting of air, oxygen-enriched air, and pure oxygen at a partial pressure of oxygen within the range of 0.1 to 40 bars.

32. A continuous process as claimed in claim 31 in which the partial pressure is within the range of 5 to 15 bars.

33. A continuous process as claimed in claim 28 in which the attack is carried out with the attack liquor at a temperature within the range of 120°–240° C.

34. A continuous process as claimed in claim 28 in which the $HCO_3^-$ is present in the attack liquor in a concentration within the range of 0 to 220 g/l and the $CO_3^=$ is present in a concentration within the range of 10 to 90 g/l.

35. A continuous process as claimed in claim 28 in which the $HCO_3^-$ is present in the attack liquor in a concentration within the range of 15 to 80 g/l and the $CO_3^=$ is present in a concentration within the range of 20 to 60 g/l.

36. A continuous process as claimed in claim 28 which includes the step of recycling a portion of the liquor separated from the redissolution of the uranium values in step (c) to the attack liquor of step (a).

37. A process as claimed in claim 36 which includes a step of subjecting the recycled liquor to oxidation to eliminate organic material contained therein.

38. A process as claimed in claim 28 which includes the step of subjecting the suspension of step (a) to oxidation to destroy organic material contained in the suspension.

39. A process as claimed in claim 28 which includes the step of washing the separated solid phase with an aqueous solution to provide a solution having a low content of soluble uranium values.

40. A process as claimed in claim 39 in which the separated solid phase is washed a second time with an aqueous medium which is then directed to the attack step.

41. A process as claimed in claim 40 in which the second stage wash liquor contains 5 to 45 g/l $CO_3^=$ and 0 to 80 g/l $HCO_3^-$.

42. A process as claimed in claim 40 in which the second stage wash liquor contains 10 to 30 g/l $CO_3^=$ and 10 to 40 g/l $HCO_3^-$.

43. A process as claimed in claim 39 in which an aqueous solution containing 5 to 170 g/l $CO_3^=$ and 90 to 0 g/l $HCO_3^-$.

44. A process as claimed in claim 39 in which the washing step uses an aqueous solution containing 10 to 60 g/l $CO_3^=$ and 75 to 10 g/l $HCO_3^-$.

45. The process as claimed in claim 28 which includes the step of washing with water the solid phase after it has been washed with the aqueous solution in step (c) of claim 28.

46. The process as claimed in claim 43 or 44 which includes the step of recycling the wash liquor in whole or in part, to the attack liquor.

47. The process as claimed in claim 28 in which the treating liquor separated from the solid phase of step (c) of claim 28 is forwarded as a liquor for the production of uranium values.

* * * * *